Sept. 27, 1966 E. C. KEHOE ETAL 3,275,529
FALLING FILM STILL HAVING CONVEX FILM FEEDING SPILLWAYS
Filed Dec. 28, 1962 4 Sheets-Sheet 3

INVENTORS
EDWARD CHARLES KEHOE
ELWOOD C. WALKER
BY
Ward, Neal, Haselton, Orme & McElhannon
ATTORNEYS Sept. 27, 1966  E. C. KEHOE ETAL  3,275,529
FALLING FILM STILL HAVING CONVEX FILM FEEDING SPILLWAYS
Filed Dec. 28, 1962  4 Sheets-Sheet 4
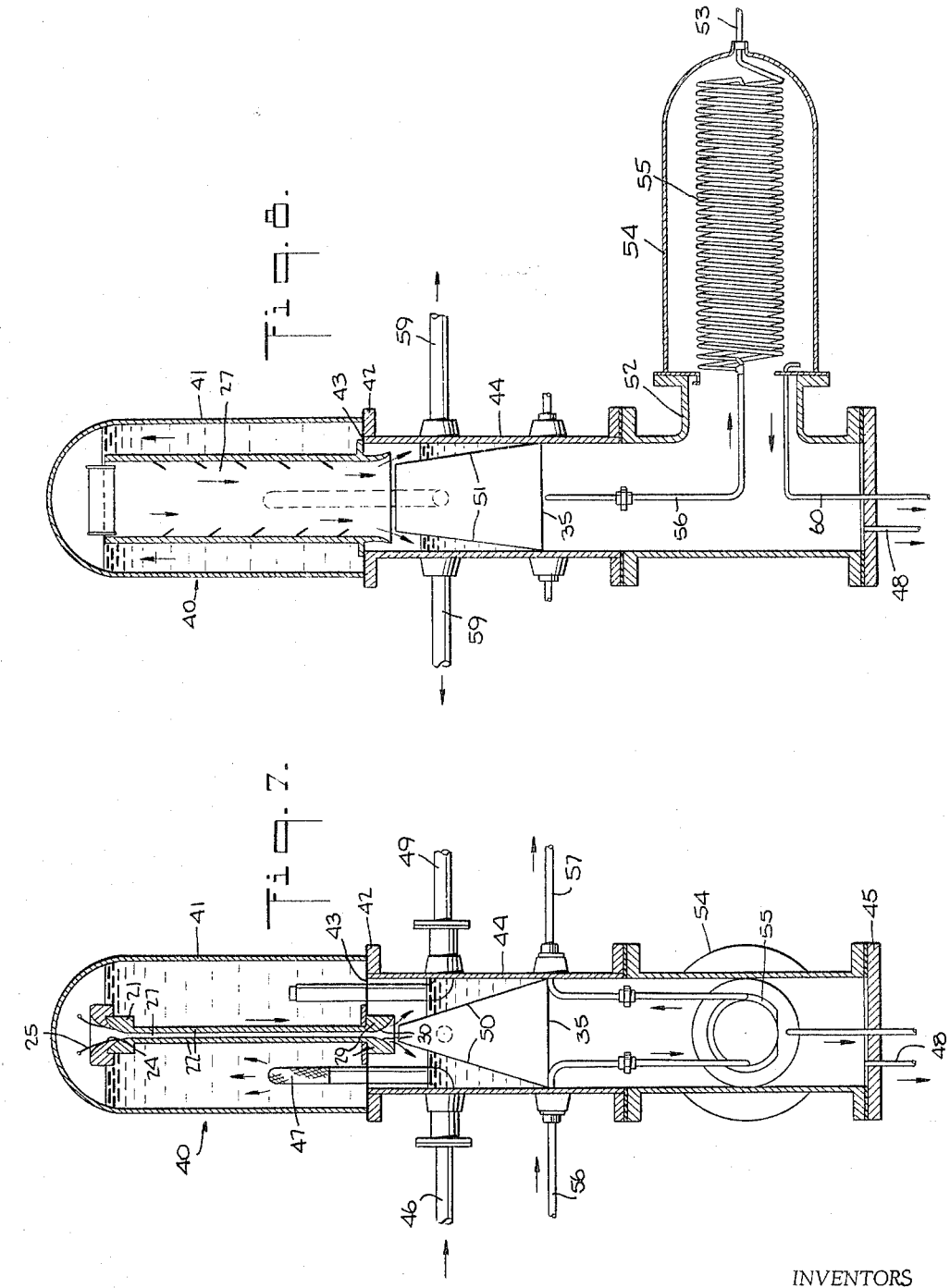
INVENTORS
EDWARD CHARLES KEHOE
ELWOOD C. WALKER
BY
Ward, Neal, Haselton, Orme & McElhannon
ATTORNEYS

3,275,529
FALLING FILM STILL HAVING CONVEX FILM
FEEDING SPILLWAYS
Edward Charles Kehoe and Elwood C. Walker, North
Caldwell, N.J., assignors, by mesne assignments, to
Saline Water Conversion Corporation, a corporation of
New York
Filed Dec. 28, 1962, Ser. No. 248,140
7 Claims. (Cl. 202—172)

This invention relates to apparatus for use in the extraction of a solvent from a solvent system containing dissolved non-volatile substances. More particularly, the present invention is concerned with improved apparatus for providing the exceedingly large surface area of liquid utilized for the recovery of solvent from solvent systems containing dissolved non-volatile substances, such as for the recovery of potable fresh water from saline or brackish water, for example, according to the concept described in co-pending application of Joseph Lichtenstein entitled "Falling Film Still," Serial No. 241,465, filed November 27, 1962, and now Patent No. 3,114,350.

In the aforesaid co-pending application there is disclosed a solvent recovery apparatus and method wherein the fluid to be treated is disposed to present a large surface area in the form of thin films; and for this purpose, resort is had to the use of a tower of the type shown and described in United States Letters Patent No. 2,760,764, for example, wherein a series of closely spaced film plates are provided having vertical surfaces, a thin film of fluid being made to flow down along these surfaces by gravity so that the required large total surface area of fluid is simultaneously and continuously presented while the tower itself is of relatively small overall volume.

Because the aforementioned co-pending application is presented in terms of the recovery of potable fresh water from saline or brackish water, the present concept will also be described in those terms, although it will be appreciated by those persons skilled in the art that the instant concept may readily be applied for the recovery of solvents from other solvent system containing dissolved non-volatile substances.

We have conceived by our invention an improved and novel construction whereby the water flowing down along the surfaces of the film plates may be controlled to an extent not heretofore possible. In this connection, those skilled in the art will appreciate that in apparatus of the class described, opposed surfaces of film plates are quite close to one another and may diverge somewhat from top to bottom to form channels into which vapor from the water films diffuse. Thus, it is important to the efficiency of the apparatus that turbulence be minimized in the flowing films, that the films be of uniform depth throughout their surface area and that arching or bridging of the films across the channels be prevented.

As an important feature of our invention, we provide vapor diffusion means including surfaces forming a vertical channel, spillways at the upper ends of the surfaces and merging with the surfaces, means supplying liquid to be vaporized to a level relatively to the spillways for delivery therealong and to the film plate surfaces in thin film disposition. Since bubbles flowing over the spillways could readily lead to objectionable bridging across the channel, we provide means such as screening through which the liquid must flow prior to reaching the spillways to eliminate large bubbles. Additionally, we may provide further means such as thin pivot plates the free ends of which are positioned adjacent the spillway surfaces to eliminate any remaining bubbles and to smooth out the films as they approach the film plates.

It is also important carefully to separate the vapor formed in the channels from the water which remains in liquid form so that particles of water containing dissolved non-volatile substances such as salt, for example, will not become intermingled with and carried off by the vapor as it moves towards a condenser. Thus, as a further feature of our invention we provide vapor collection means positioned below the channel, for collecting the vapor only and conveying it towards a condenser; and means at the lower end of the channel merging with the film plate surfaces and diverging relatively to one another to lead the films on such surfaces away from the vapor collection means to water collection means offset in respect of the channel.

We have observed that as the water films flow down along the film plates, there is a tendency for it to accumulate in relatively thick layers at the ends of the plates and to thin out between the ends. Thus the present concept includes means for directing the water away from the ends of the plates to compensate for the aforementioned tendency and to maintain the film thickness substantially uniform on the film plate surfaces. Such means may conveniently take the form of shallow baffles or kerfs in the surfaces of the plates so arranged as to dispose the water film as desired.

While the invention has been described thus far in connection with a single channel, it will be appreciated that any number of similar channels may be used.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 5 is a fragmentary view of a single channel and its co-operating parts;

FIG. 6 is a detail section view illustrating one form of means for eliminating bubbles and smoothing the water films approaching opposed film plates.

FIG. 7 is a side elevational sectional view of a modified form of the invention; and FIG. 8 is an end elevational sectional view of the modification shown in FIG. 7.

Figure 1:
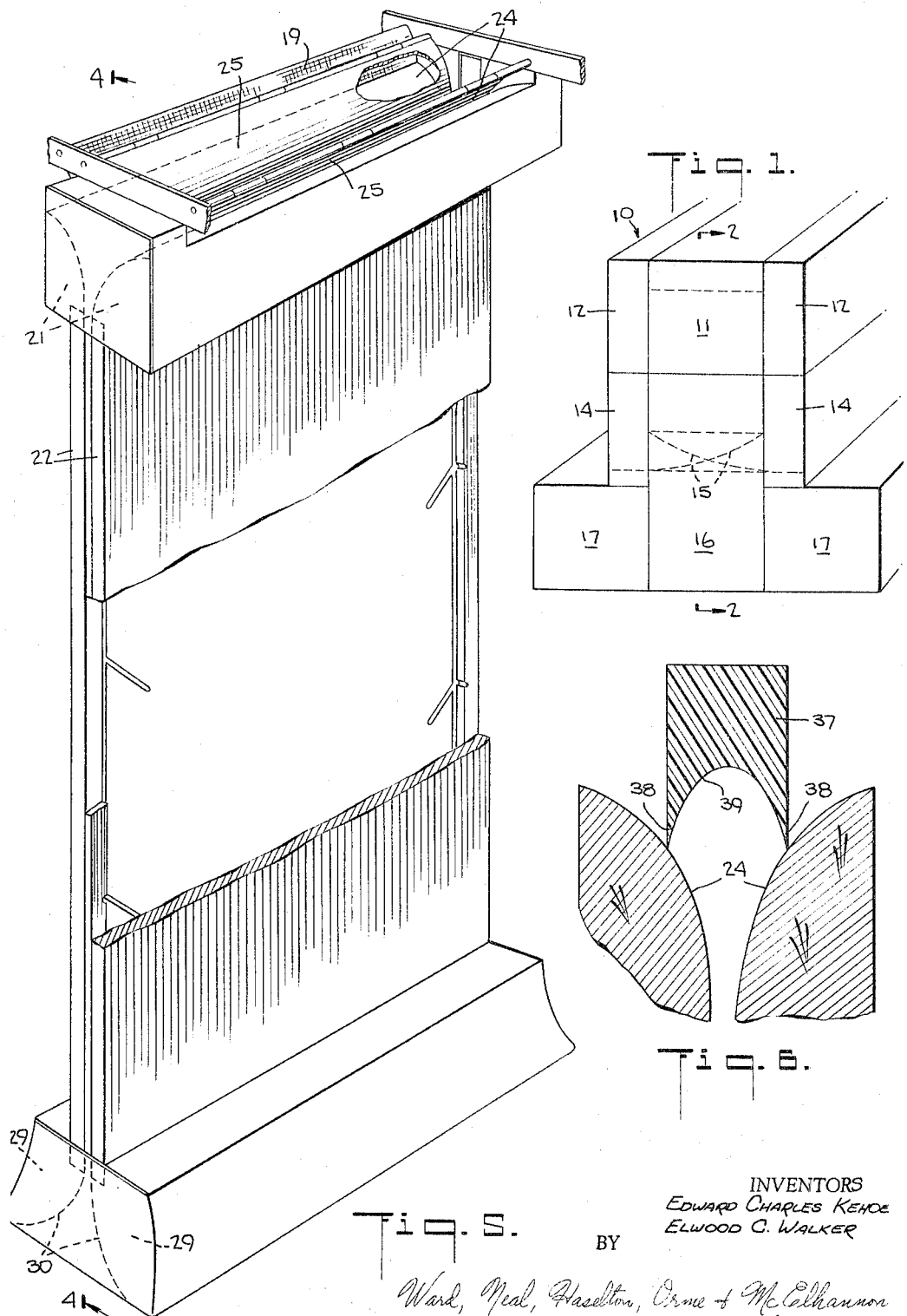
FIG. 1 is a perspective view of a housing for containing a recovery system embodying the features of the present invention.

Referring now to the drawings in detail, and more particularly to FIG. 1 thereof, there is shown a housing 10, the upper central zone 11 of which comprises a series of adjacent, parallel pairs of opposed film plates. Immediately adjacent the zone 11 on each side thereof and extending the length of the housing are tanks 12 into which the saline water is pumped, these tanks serving as reservoirs and feeding the water to the several pairs of film plates. Actually, any suitable means of directing the water to the plates may be used and the means described here is by way of example only.

The housing 10 also contains tanks 14 below the tanks 12 for receiving the water that reaches the bottom of the film plates and discharging it. As this water leaves the bottom of the plates it may be directed laterally by flumes 15 or the like about which more will be said later.

The vapor formed in the channels is received in a plenum chamber 16 positioned between two condensers represented by the numeral 17 and in which the vapor formed in the channels is condensed to potable fresh water of desired salinity.

Figure 2:
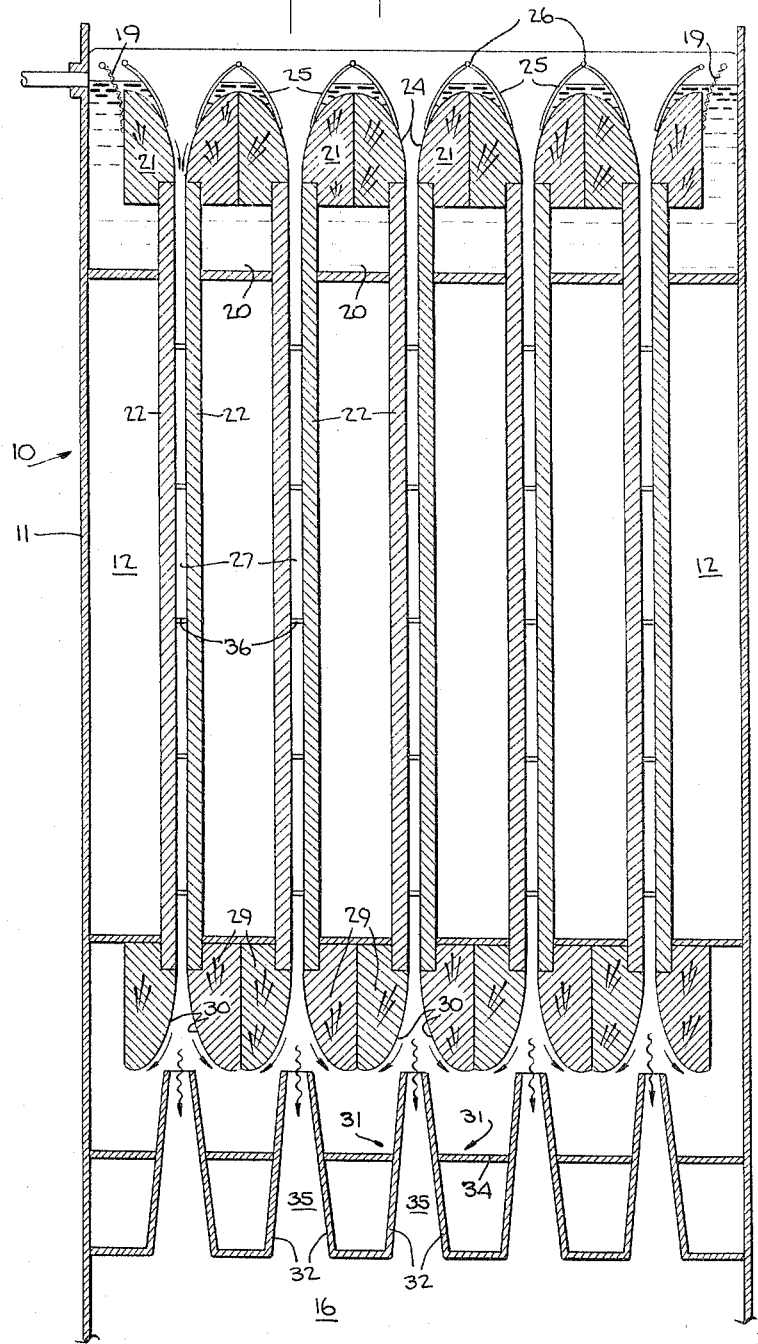
FIG. 2 is a cross-sectional view taken along the line 2—2 of FIG. 1.
Figure 3:
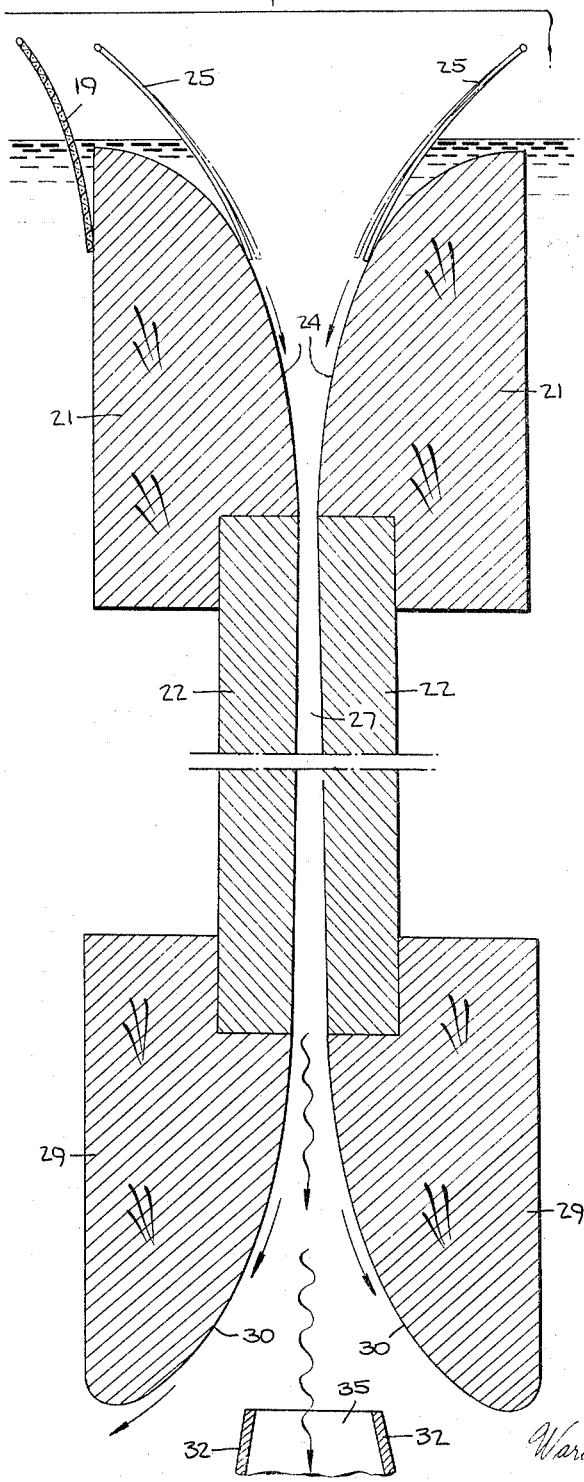
FIG. 3 is an enlarged detail view illustrating the construction shown in FIG. 2.
Figure 4:
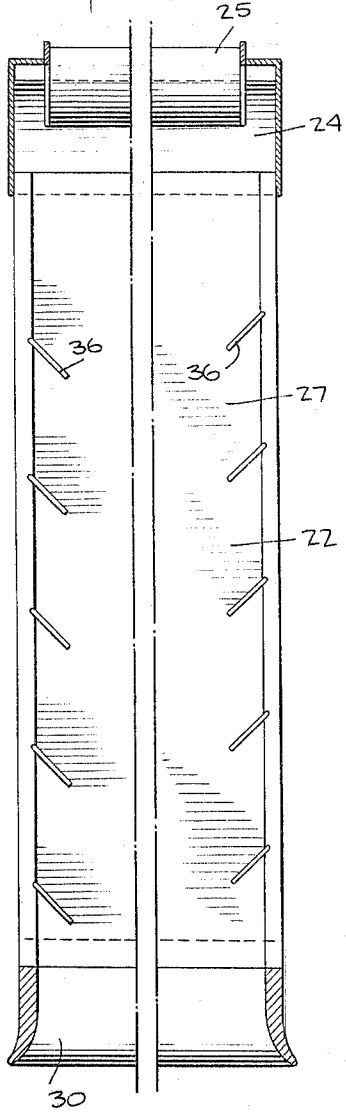
FIG. 4 is a cross-sectional view taken along the line 4—4 of FIG. 5.

Turning now to FIGS. 2 and 3, the central zone 11 of the housing 10 is shown along with the tanks 12. Water from these tanks passes through screens 19 to the channels at each end of the housing 10. In passing through the screens 19 any large bubbles are eliminated and turbulence is reduced. Suitable ducts (not shown) may communicate with the tanks 12 and with the upper region of each channel to provide water as shown in each case. By way of example, the water might be caused to flow to shallow tanks 20 between the channels and thence up through convenient openings (not shown) in spillway blocks 21 to flow in films to the plates 22 on each side thereof.

In any case, the spillway blocks 21 are formed with gently curved outer surfaces 24 which flatten out somewhat as they approach the surfaces of the film plates 22 with which they merge. By such means the water assumes a film or sheet-like attitude and is stretched out over the curved portions of the spillways to eliminate bridging of the water across the small gap between opposed film plates 22. Any bubbles remaining in the water as it starts down the spillways are removed and any turbulence is reduced by pivot plates 25 hingedly mounted on pins 26 above the spillway blocks 21 and terminating in edges extending along the length of the blocks and substantially tangentially thereto at about the mid-portion of the surfaces thereof. Thus each water film must pass between its respective spillway surface and the edge of its respective pivot plate so that bubbles are squeezed and burst and the water film is urged to a uniform thickness.

As fully described in the aforementioned co-pending application, the relationship of the saturation pressure of the water flowing down along the plates 22 and the absolute pressure in the channels 27 therebetween is such that water vapor diffuses from the surface of the films into the space comprising the channels, this vapor flowing downwardly cocurrently with the water films.

We have already mentioned that it is highly desirable that particles of water be prevented from becoming admixed with the vapor and for this purpose we provide novel means for assuring the desired result. Thus, at the lower end of each channel we provide blocks 29 the surfaces 30 of which merge with the film plate surfaces and then curve gently convexly so that opposed surfaces 30 of blocks 29 diverge. These surfaces 30 take advantage of the surface tension of the water and gently divert the flow of water away from the path of the vapor. Eventually, the water films of course break with the surfaces 30 and drop into troughs 31 having downwardly converging sides 32 between which are positioned partitions 34 which cooperate with the sides 32 to provide the flumes 15 referred to in connection with FIG. 1. Thus, the water leaving the surfaces 30 drops into the troughs 31 and is directed laterally to tanks 14 and thence to discharge. To balance the forces generated by the moving water, the flumes may alternately direct the water to opposite tanks 14.

The vapor passing down through the channels enters a nozzle-like passage 35 formed by opposed walls 32 of adjacent troughs 31. These passages 35 permit the vapor to expand into plenum chamber 16 with which they communicate; and from these the vapor flows into the condensers 17 where it is condensed into fresh water and collected. The condensers of course provide a negative pressure which determines the path of flow of the vapor from the channels 27.

It will now be seen that the water and vapor take different paths after reaching the bottom of the channels thereby reducing the likelihood of admixture of water particles with the vapor. In the event however that some water particles do become admixed with the vapor, they will drop to the bottom of the plenum chamber 16 as the vapor changes direction to enter the condensers, and may conveniently be drained off.

It will be recalled that we have stated that the water has a tendency to gather at the ends of the film plates. We have succeeded in counteracting this tendency by providing several vertically spaced deflecting means within the chambers 27 to urge excess water away from the sides of the chambers. These deflecting means may comprise thin baffles 36 mounted upon the film plate surfaces and extending inwardly and downwardly from the sides of the channels to urge some of the water towards the center of the channels while some flows over the baffles. Alternatively, shallow kerfs may be cut in the surfaces of the film plates in similar attitude as the baffles 36 shown, and for the same purpose. In addition, we may so dispose the means by which the water enters upon the spillway surfaces as to restrict its initial flow to a central zone of each spillway surface. Thus, if as mentioned the water reaches these surfaces by flowing up centrally through the blocks 21 the passage or passages through these blocks may be restricted to a central zone thereof.

Referring now to FIG. 6, there is shown an alternative form of pivot plate. In this embodiment, an elongate block 37 of plastic material such as nylon, for example, may be formed with a recess 39 in the lower surface thereof to provide a pair of thin, flexible and resilient flaps 38. The blocks 37 are so dimensioned and positioned that the edges of the flaps are disposed adjacent spillway surfaces 24. The action and effect of these flaps 38 is precisely the same as those already described in connection with pivot plates 25.

Referring now to the embodiment shown in FIGS. 7 and 8 there is shown a housing 40 corresponding to housing 10 already described. This housing is shown with a dome shaped top 41 fixed to a flange or collar 42 at the upper end of a tubular body 44 closed at its bottom by a plate 45 having a drain line 48 passing therethrough. The interior of the top 41 of housing 40 is sealed from the lower part by a plate 43 positioned atop the flange 42.

While only a single pair of opposed plates 22 forming a single channel 27 are shown for purposes of illustration, it will be appreciated that any number of pairs of plates may be employed and that these may be of any size according to the requirements of the particular system.

In this embodiment, the solution from which the solvent is to be recovered, which for convenience will be referred to as saline water, is delivered to the top 41 of the housing 40 through an inlet pipe 46 provided with a mesh filter 47 at its outlet in the top 41 of the housing 40. A drain line 49 may be used to empty the top 41 of the housing.

The plates 22 are identical with those already described and are supported in the housing 40 by the plate 43 through which the lower part of the plates pass, as clearly shown in FIGS. 7 and 8. Immediately below the channel 27, we form the nozzle-like passage 35 formed of downwardly divergent side walls 50 (FIG. 7) and 51 (FIG. 8). It will be understood of course that if several pairs of plates 22 are used, as would be the case in a commercial application, then an equal number of passages 35 would also be used. The lower part of the housing 40 forms a juncture as at 52 with a condenser housing 54 enclosing a condenser which may take the form of a coil 55. A pipe 53 enters the housing 54 and may be connected to suitable pump means (not shown) for removal of air and other non-condensibles. Cooling water enters the condenser through line 56 and leaves through line 57. Cool sea water may be used as a condensing medium if desired, and may then be discharged or used in the system as more fully described in the aforementioned co-pending application of Joseph Lichtenstein.

As the water lever in the housing 40 reaches the top of the spillway blocks 21 it flows down the spillway surfaces 24, passing under the pivot plates 25 and is disposed on the inner surfaces of the plates 22 in thin film disposition from which vapor diffuses into the channel 27, as described in the aforementioned co-pending application. The vapor passes downwardly, leaves the channel 27 and enters and expands in the passage 35 from which it is drawn to the condenser by the pressure drop caused by the action of the condenser in condensing the vapor.

Meanwhile, the water that reaches the bottom of the channel flows along the surfaces 30 of block 29 and falls into the space formed by the exterior surfaces of the walls 50 and 51 and the inner surface of the housing 40 to be drawn off through lines 59 (FIG. 8).

A pipe line 60 communicates with the lower portion of the condenser housing 54 for drawing off the product of the system as it accumulates as condensate beneath the condenser coil.

It will be appreciated that the condenser may be enlarged if necessary, or one or more additional condensers may be used by providing additional housings 54, coils 55 and pipe lines 60 connected with the housing 40, as required. It will be noted that the lower part of the housing 40 acts as a plenum chamber for the vapor which must flow downwardly and then horizontally to reach the condenser while any particles of water in this chamber will drop to the plate 45 and be drained off through drain 48.

From the foregoing description it will be seen that we contribute improved apparatus for providing the exceedingly large surface area of liquid flowing down closely adjacent, opposed film plates while reducing turbulence and eliminating the danger of bridging. We also contribute efficient and convenient means for preventing unevaporated liquid particles from becoming admixed with the vapor formed in the channels between adjacent film plates.

The construction and operation of our novel control apparatus will now be understood and the advantages thereof will be fully appreciated by those persons skilled in the art.

We now claim:

1. In a system of the class described, a housing, vapor diffusion means in said housing including opposed film plates forming a vertical channel therebetween, gently curved convex surfaces defining spillways at the upper end thereof merging flush with the plates, means supplying liquid to be vaporized to said housing to a level relatively to said spillways for delivery therealong and to said plates in thin film disposition, means at the lower end of said channel merging flush with said plates and diverging relatively to one another to lead the films on said plates to collection means offset from said channel, vapor collection means positioned below said channel and between said film collection means, condenser means, and means conducting the vapor from said collection means to said condenser.

2. In a system of the class described, a housing, vapor diffusion means in said housing including a vertical channel defined by opposed plates, spillways at the upper end thereof comprising gently curved convex surfaces merging flush with the channel plates, means supplying liquid to be vaporized to said housing to a level relatively to said spillways for delivery therealong and to said plates in thin film disposition, means at the lower end of said channel merging flush with said plates and diverging relatively to one another to lead the films on said plates to liquid collection means offset from said channel, vapor collection means positioned below said channel and between the liquid collection means, a plenum chamber below said vapor collection means and communicating with same, condenser means disposed laterally of said plenum chamber, and means conducting the vapor from said vapor collection means to said plenum chamber and thence to said condenser.

3. In a system of the class described, a housing, a plurality of vapor diffusion means in said housing each including a vertical channel defined by opposed plates, spillways at the upper end thereof comprising gently curved convex surfaces merging flush with the channel plates, means supplying liquid to be vaporized to said housing to a level relatively to said spillways for delivery therealong and to said plates in thin film disposition, means at the lower end of said channel merging flush with said plates and diverging relatively to one another to lead the films on said plates away from the path of flow of vapor, liquid collection means offset from said channels and positioned to collect the liquid from said divergent surfaces, vapor collection means positioned below said channels, condenser means, and means conducting the vapor from said vapor collection means to said condenser.

4. In a system of the class described, a housing, a plurality of vapor diffusion means in said housing each including a vertical channel defined by opposed plates, spillways at the upper end thereof comprising gently curved convex surfaces merging flush with the channel plates, means supplying liquid to be vaporized to said housing to a level relatively to said spillways for delivery therealong and to said plates in thin film disposition, said plates having deflection means at the sides thereof directing excessive liquid towards the center of said channels, means at the lower end of said channel merging flush with said plates and diverging relatively to one another to lead the films on said plates away from the path of flow of vapor, liquid collection means offset from said channels and positioned to collect the liquid from said divergent surfaces, vapor collection means positioned below said channels, condenser means, and means conducting the vapor from said vapor collection means to said condenser.

5. In apparatus of the class described, vapor diffusion means comprising opposed film plates having flat surfaces forming vertical channels therebetween, spillways having convex surfaces at the upper end of said plates and merging with the film plate surfaces, means supplying liquid to be vaporized to said spillways for delivery therealong and to said surfaces in thin film disposition, means disposed adjacent each spillway acting on the liquid films flowing thereover to smooth such films, means at the lower end of said channels merging with said surfaces and diverging relatively to one another to lead the films on said surfaces to collection means offset from said channels condenser means, and means conducting the vapor from said channels to said condenser means.

6. In apparatus of the class described, vapor diffusion means comprising opposed film plates having flat surfaces forming vertical channels therebetween, spillways at the upper end thereof comprising gently curved convex surfaces merging flush with the channel plates, means supplying liquid to be vaporized to said spillways for delivery to said plates in thin film disposition, yieldably mounted plates disposed adjacent each spillway and having free edges extending along adjacent the spillway surfaces wherefor each liquid film passes between and in contact with its respective spillway surface and the edge of the corresponding yieldably mounted plate and is smoothed thereby, means at the lower end of the channels to lead the films on said plates to liquid collection means, condensing means, and means below said channels conducting vapor formed in said channels to said condensing means.

7. In apparatus of the class described, vapor diffusion means comprising opposed film plates having flat surfaces forming vertical channels therebetween, spillways at the upper end thereof comprising gently curved convex surfaces merging flush with the channel plates, means supplying liquid to be vaporized to said spillways for delivery to said plates in thin film disposition, yieldable resilient flaps extending along adjacent the spillway surfaces and acting on the liquid films flowing thereover whereby each liquid film passes between and in contact with its respective spillway surface and the corresponding flap and is smoothed thereby, means at the lower end of the channels to lead the films on said plates to liquid collection means, condensing means, and means below said channels conducting vapor formed in said channels to said condensing means.

References Cited by the Examiner

UNITED STATES PATENTS

| | | | |
|---|---|---|---|
| 265,974 | 10/1882 | Nichols | 159—13 |
| 959,933 | 5/1910 | Harris | 159—8 |
| 1,250,427 | 12/1917 | Campbell | 159—8 |
| 2,195,449 | 4/1940 | Delen | 261—112 |
| 2,266,941 | 12/1941 | Van de Griendt | 203—40 |
| 2,295,088 | 9/1942 | Kleucker. | |
| 2,334,959 | 11/1943 | Rosenblad. | |
| 2,545,028 | 3/1951 | Haldeman. | |
| 2,779,724 | 1/1957 | Dunning et al. | 202—236 |
| 3,214,349 | 10/1965 | Kehoe et al. | 203—11 |
| 3,214,350 | 10/1965 | Lichtenstein | 203—11 |
| 3,214,351 | 10/1965 | Lichtenstein et al. | 261—11 |

FOREIGN PATENTS

| | | |
|---|---|---|
| 65,062 | 10/1892 | Germany. |
| 61,885 | 1/1940 | Norway. |

NORMAN YUDKOFF, *Primary Examiner.*

WILBUR L. BASCOMB, JR., H. M. SILVERSTEIN,
*Assistant Examiners.*